United States Patent

[11] 3,609,097

| [72] | Inventor | Herbert Koppe |
| | | Frankfurt am Main, Germany |
| [21] | Appl. No. | 742,945 |
| [22] | Filed | July 5, 1968 |
| [45] | Patented | Sept. 28, 1971 |
| [73] | Assignee | Metallgesellschaft Aktiengesellschaft |
| | | Frankfurt am Main, Germany |
| [32] | Priority | July 6, 1967 |
| [33] | | Germany |
| [31] | | M 74655 IVa/12g |

[54] CATALYST REGENERATION
1 Claim, 1 Drawing Fig.

[52] U.S. Cl. .................................................. 252/419,
23/288 R, 23/288 B, 23/289, 252/416, 252/420
[51] Int. Cl. ..................................................... B01j 11/04
[50] Field of Search ........................................... 252/414,
416, 418, 420; 23/288, 289, 28

[56] References Cited
UNITED STATES PATENTS

| 2,454,901 | 11/1948 | Vinyard et al. ............... | 252/418 X |
| 2,620,967 | 12/1952 | Worn ........................... | 252/419 |
| 2,955,925 | 10/1960 | Parker ......................... | 23/288 |

FOREIGN PATENTS

| 1,070,773 | 12/1959 | Germany ..................... | 252/416 |

*Primary Examiner*—Daniel E. Wyman
*Assistant Examiner*—P. E. Konopka
*Attorney*—Stephens, Huettig & O'Connell

ABSTRACT: A steam injector is used to circulate regenerating gas through a catalyst bed to burn off carbonaceous deposits on the catalyst.

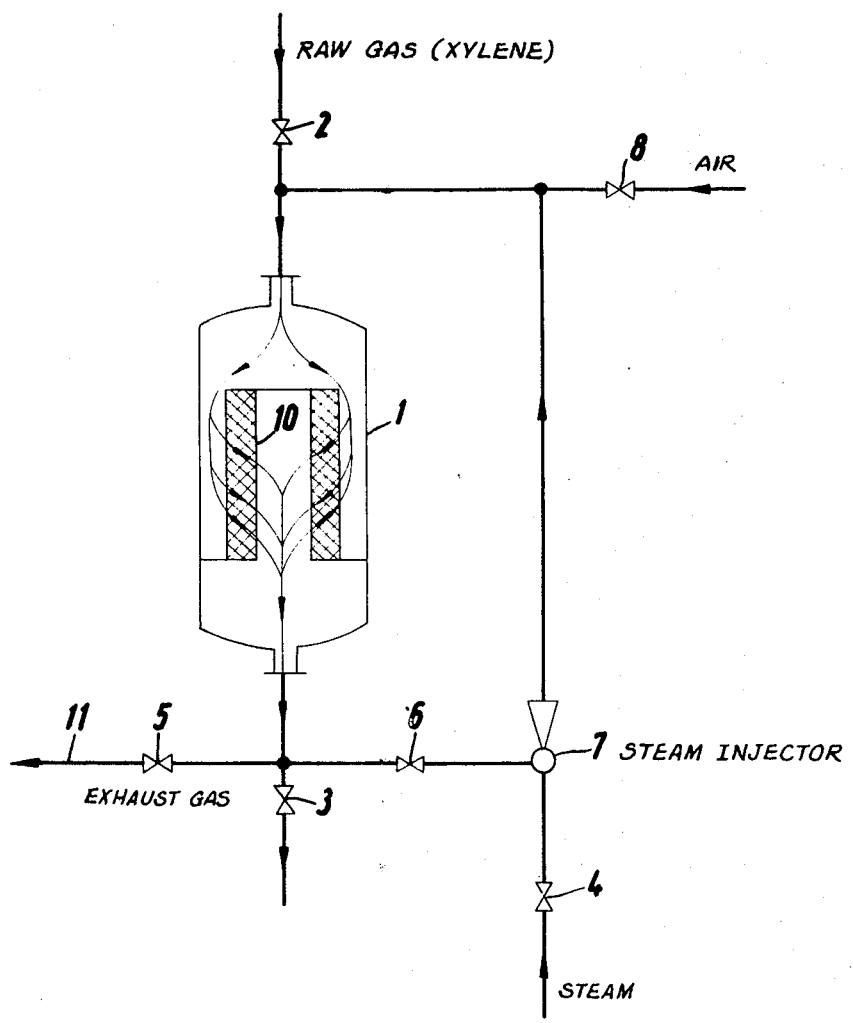

CATALYST REGENERATION

In many catalytic processes in which carbonaceous compounds are employed, there is a loss of catalyst activity after a certain reaction time. This loss of activity is due to high-carbon deposits on the surface of the catalyst.

It is known to regenerate the catalyst by a careful burning of these high-carbon deposits.

Catalytic processes involving such an oxidizing regeneration of the catalyst include, for example, the cracking of petroleum fractions on alumina catalysts, the isomerization of hydrocarbons, particularly the catalytic conversion of m-xylene to o- and p-toluene, and the detoxicating catalytic purification of coke oven gas by a conversion of the carbon monoxide contained in the coke oven gas into hydrogen and carbon dioxide. This catalytic pretreatment of the coke oven gas results in an elimination of nitrogen oxides, resin-forming unsaturated hydrocarbons, as well as organic sulfur compounds as high-molecular, high-carbon deposits on catalysts which contain molybdenum or copper.

The removal of such reaction residues from the catalyst by burning results in a considerable generation of heat, which may damage the catalyst. For this reason, the oxidizing regeneration is carried out with a low-oxygen gas, such as flue gas, steam or some other inert gas which is available and to which air is admixed to an oxygen concentration of about from 1 to 10 percent.

Particularly in catalytic processes using a fixed bed of catalyst, the reactors are operated intermittently and are changed over in alternation between reaction and regenerating phases.

From this mode of operation, a more nearly continuous operation is enabled if several reactors are successively brought into the reaction condition and into the regenerating condition and, if desired, into intermediate scavenging conditions in a cyclic sequence.

To minimize the inert gas requirement and to avoid heat losses, the regenerating gas is passed through the reactor which contains the catalyst to be regenerated. To maintain the predetermined oxygen concentration, air is admixed to that cycle before the gas enters the reactor. A corresponding partial stream is branched off behind the reactor and discarded.

A plant for an oxidizing regeneration of catalysts is disclosed, for example, in Printed German Application No. 1,070,773.

Circulating blowers have been used so far to maintain this circulation of regenerating gas. These blowers have been found to be susceptible to corrosion and thermal damage, particularly when the regeneration is carried out at temperatures above 500° C.

To minimize the generation of heat during the regeneration of the catalyst, a low oxygen content circulating gas is employed even though it requires a longer time for the treatment with the circulating gas. Alternatively, the high-carbon deposits are not permitted to build up on the catalyst to such a height that the catalyst activity is appreciably affected and the regeneration is carried out in relatively short, equal intervals of time so that only small amounts of these deposits must be burnt at one time.

In any case, the blower draws the hot spent regenerating gas from the reactor and discharges it toward the gas inlet of the reactor.

The amount of air which is admixed to the spent regenerating gas to make up its oxygen content is too small for a substantial reduction of temperature.

When the air is added on the suction side of the blower, the air will increase the loading of the blower and the oxygen content of the air will increase also the danger of corrosion.

For this reason it is usual to add the air for making up the oxygen content into the cycle on the discharge side of the blower.

In this invention, it has been found that the oxidizing regeneration of catalysts by means of a hot gas having a predetermined, low oxygen content can be carried out in a much simpler and more reliable manner if the circulation of regenerating gas through the reactor is maintained by a steam-powered injector.

This invention relates to a process for an oxidizing regeneration of catalysts damaged by carbonaceous deposits, which regeneration is effected by means of a steam-containing regenerating gas which has a predetermined, low oxygen content and is circulated through the catalyst bed.

The process according to this invention is characterized in that the circulation of the regenerating gas through the catalyst bed is maintained by a steam-powered injector.

This mode of operation has the advantage that the injector does not have movable parts which are sensitive to high temperature and frequent temperature change cycles and that steam constituting a component of the regenerating agent is used as a motive fluid for maintaining the circulation of regenerating gas.

The means by which the objects of this invention are obtained are described more fully with reference to the accompanying schematic drawing which is a flow diagram of the gas supplied to the reactor.

The apparatus consists essentially of the reactor 1 containing a catalyst bed 10, and the steam injector 7. Valves 4, 5, 6, 8 are closed during the reaction operation of the reactor. The reaction mixture to be reacted is introduced into the reactor through the supply line, in which the valve 2 is open. The reaction product is discharged from the reactor through the discharge line, in which the valve 3 is open.

To initiate the regeneration, the valves 2, 3 are closed. The valve 4 is opened to blow steam through the reactor so as to expel residual reaction mixture. When the valve 5 is open, the exhaust gas escapes through the exhaust line 11. When the scavenging has been completed, the valve 5 is throttled and the valve 6 is opened. The suction produced by the steam injector 7 causes the regenerating gas to circulate through the reactor. The valve 8 is opened so that air is admixed to the cycle, for example, from a compressed air line. Gas is discarded at a corresponding rate through the partly opened valve 5 and exhaust line 11.

This invention is explained more fully in the following example in conjunction with a process for isomerizing xylene.

EXAMPLE

Reactor 1 contained a cylindrical annular bed of 5,500 kilograms of loose isomerization catalyst consisting mainly of aluminum silicate. A xylene mixture consisting of

| | |
|---|---|
| ethyl benzene | 18.5 percent by weight |
| p-xylene | 11.5 percent by weight |
| m-xylene | 63.5 percent by weight |
| o-xylene | 6.5 percent by weight |
| | 100.0 percent by weight | was fed to the reactor at a rate of 7,500 kilograms per hour and preheated in a tubular heater to about 500° C. After a predetermined reaction operation time of about 24 hours, the deposition of carbon on the catalyst had somewhat reduced the degree of isomerization and the valves 2 and 3 were closed to stop the supply of the xylene mixture. Steam at 200 kilograms per hour was now supplied to the reactor 1 to expel the reaction mixture from the reactor. In this phase of the operation, the catalyst had carbon deposits amounting to about 1 percent by weight. The valve 6 was now opened and the injector 7 operated to circulate regenerating gas at a rate of 4,000 standard cubic meters per hour through the reactor, which was initially at a temperature of 500° C. After about 30 minutes, the steam had become heated from 150° C. to 485° C. whereas the catalyst bed had cooled from 500° C. to 485° C. Thereafter, the circulation was maintained and air at about 80 kilograms per hour was fed into the cycle through open valve 8. The circulating gas now had an oxygen content of about 1 percent so that the carbon deposits on the catalyst were burned off within about 8 hours. In this phase, the catalyst temperature increased from 485° to 540° C. The rate of exhaust gas in line 11 corresponded to the rates at which steam through valve 4 and air through valve 8 were supplied into the cycle and with which carbon was burned. The air supply through valve 8 was then stopped and the residual gas was displaced from the cycle by the steam through valve 4 at the rate of 200 kilograms per hour. In this phase, the catalyst bed cooled from 540° C. to 500° C. and activated at the same time so that it was subsequently available for the reaction. The circulation of gas was then interrupted by closing valve 6, stopping the steam supply by closing valve 4, and closing valve 5. The reaction operation was then resumed by opening the valves 2 and 3.

When steam and air are supplied at higher rates, the regenerating time can be further reduced and the capacity of the reactor can be utilized even more fully.

Having now described the means by which the objects of this invention are obtained,

I claim:

1. A process for the regeneration of a bed of catalyst by combustion of the carbonaceous contaminants in said bed; comprising the steps of drawing the carbonaceous contaminants from said bed of catalyst by means of steam in a steam injector, adding sufficient air to the mixture of products of combustion and steam flowing from said steam injector to provide a low percentage of oxygen in said mixture, and returning said mixture with its added air to said bed of catalyst so that said mixture is continuously circulated through said bed of catalyst and venting said bed of catalyst adjacent the point of suction of said steam injector from said bed of catalyst to avoid a pressure buildup of said mixture in said bed of catalyst.